US008806102B2

(12) United States Patent  (10) Patent No.: US 8,806,102 B2
Hirano  (45) Date of Patent: Aug. 12, 2014

(54) CACHE SYSTEM

(75) Inventor: Takahito Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 513 days.

(21) Appl. No.: 13/012,985

(22) Filed: Jan. 25, 2011

(65) Prior Publication Data

US 2011/0197013 A1    Aug. 11, 2011

(30) Foreign Application Priority Data

Feb. 10, 2010   (JP) .................................. 2010-27111

(51) Int. Cl.
  *G06F 12/00*  (2006.01)
  *G06F 12/08*  (2006.01)
(52) U.S. Cl.
  CPC .................................. *G06F 12/0811* (2013.01)
  USPC ........................................................... 711/3
(58) Field of Classification Search
  USPC ....................................................... 711/149
  See application file for complete search history.

(56) References Cited

U.S. PATENT DOCUMENTS

| 5,442,770 | A | 8/1995 | Barratt |   |
|---|---|---|---|---|
| 6,763,422 | B2 | 7/2004 | Endo |   |
| 2005/0240733 | A1 * | 10/2005 | Luick | 711/137 |

FOREIGN PATENT DOCUMENTS

| EP | 0330007 | 8/1989 |
| JP | 2002-278836 | 9/2002 |

OTHER PUBLICATIONS

Skadron, Kevin et al. "Design Issues and Tradeoffs for Write Buffers" in: Proceedings of the 3rd International Symposium on High Performance Computer Architecture, pp. 144-155, Feb. 1997.*
"Extended European Search Report" mailed by EPO and corresponding to European Patent Application No. 11153588.6 on Jul. 11, 2011.
CNOA—Office Action of Chinese Patent Application No. 201110037745.1 dated Mar. 5, 2014 with English translation.

* cited by examiner

*Primary Examiner* — Brian Peugh
(74) *Attorney, Agent, or Firm* — Fujitsu Patent Center

(57) ABSTRACT

A cache system includes a primary cache memory configured to input and output data between a computation unit, the primary cache memory includes multi-port memory units each including a storing unit that stores unit data having a first data size, a writing unit that simultaneously writes sequentially inputted plural unit data to consecutive locations of the storing unit, and an outputting unit that reads out and outputs unit data written in the storing unit, wherein when writing data having a second data size that is an arbitrary multiple of a first data size and is segmented into unit data to the primary cache memory, the data is stored in different multi-port memory units by writing the sequential unit data to a subset of the multi-port memory units, and writing the other sequential unit data to another subset of the multi-port memory units.

6 Claims, 17 Drawing Sheets

FIG. 3A

| RAM(0) | RAM(1) | RAM(2) | RAM(3) |
|---|---|---|---|
| WAY 1 | WAY 1 | BLOCK 14 | BLOCK 15 |
| BLOCK 10 | BLOCK 11 | BLOCK 12 | BLOCK 13 |
| BLOCK 08 | BLOCK 09 | WAY 1 | WAY 1 |
| WAY 1 | WAY 1 | BLOCK 06 | BLOCK 07 |
| BLOCK 02 | BLOCK 03 | BLOCK 04 | BLOCK 05 |
| BLOCK 00 | BLOCK 01 | WAY 1 | WAY 1 |

FIG. 3B

| RAM(0) | RAM(1) | RAM(2) | RAM(3) |
|---|---|---|---|
| BLOCK 14 | BLOCK 15 | WAY 0 | WAY 0 |
| BLOCK 12 | BLOCK 13 | BLOCK 10 | BLOCK 11 |
| WAY 0 | WAY 0 | BLOCK 08 | BLOCK 09 |
| BLOCK 06 | BLOCK 07 | WAY 0 | WAY 0 |
| BLOCK 04 | BLOCK 05 | BLOCK 02 | BLOCK 03 |
| WAY 0 | WAY 0 | BLOCK 00 | BLOCK 01 |

FIG. 3C

| ADDRESS 00 | 08 | 10 | 18 | 20 | 28 | 30 | 38 |
|---|---|---|---|---|---|---|---|
| BLOCK 00 | BLOCK 01 | BLOCK 02 | BLOCK 03 | BLOCK 04 | BLOCK 05 | BLOCK 06 | BLOCK 07 |

| ADDRESS 40 | 48 | 50 | 58 | 60 | 68 | 70 | 78 |
|---|---|---|---|---|---|---|---|
| BLOCK 08 | BLOCK 09 | BLOCK 10 | BLOCK 11 | BLOCK 12 | BLOCK 13 | BLOCK 14 | BLOCK 15 |

FIG. 4

| DUAL PORT RAM(0) | DUAL PORT RAM(1) | DUAL PORT RAM(2) | DUAL PORT RAM(3) |
|---|---|---|---|
| EVN w1 INDEX n | ODD w1 INDEX n | EVN w0 INDEX n | ODD w0 INDEX n |
| EVN w1 INDEX n-1 | ODD w1 INDEX n-1 | EVN w0 INDEX n-1 | ODD w0 INDEX n-1 |
| ⋮ | ⋮ | ⋮ | ⋮ |
| EVN w0 INDEX 5 | ODD w0 INDEX 5 | EVN w1 INDEX 5 | ODD w1 INDEX 5 |
| EVN w0 INDEX 4 | ODD w0 INDEX 4 | EVN w1 INDEX 4 | ODD w1 INDEX 4 |
| EVN w1 INDEX 3 | ODD w1 INDEX 3 | evn w0 index3 | ODD w0 INDEX 3 |
| EVN w1 INDEX 2 | ODD w1 INDEX 2 | evn w0 index2 | ODD w0 INDEX 2 |
| EVN w0 INDEX 1 | ODD w0 INDEX 1 | EVN w1 INDEX 1 | ODD w1 INDEX 1 |
| EVN w0 INDEX 0 | ODD w0 INDEX 0 | EVN w1 INDEX 0 | ODD w1 INDEX 0 |

▒▒▒ WAY(1)    ☐ WAY(0)

FIG. 11

| GENERATED ADDRESS | | CONVERTED ADDRESS | |
|---|---|---|---|
| VA(1) | VA(2) | VA(3) | VA(4) |
| 100 | 0 | 100 | 8 |
| 100 | 4 | 100 | C |
| 100 | 8 | 101 | 0 |
| 100 | C | 101 | 4 |
| 101 | 0 | 101 | 8 |

CACHE SYSTEM

CROSS-REFERENCE TO RELATED APPLICATION

This application is based upon and claims the benefit of priority of the prior Japanese Patent Application No. 2010-27111, filed on Feb. 10, 2010, the entire contents of which are incorporated herein by reference.

FIELD

Embodiment of the invention relates to a cache system that stores data used in computations.

BACKGROUND

In a computer system, a small amount of fast cache memory is typically provided separately from the main memory. Multiple levels of cache memory are provided, in order to cut back on accessing the main memory when a cache miss occurs. For example, a secondary cache that can be accessed faster than the main memory may be provided between the primary cache and the main memory.

In the related art, technology for speeding up data transfers with the CPU is realized by a main memory operating in accordance with a standard referred to as Double Data Rate 2 (DDR2). DDR2 is a technique that utilizes both the rising edge and falling edge of a clock signal when synchronizing respective circuits inside a computer. According to DDR2, the data processing efficiency per unit time can be increased by a factor of two as compared to the case of synchronizing respective circuit by using only the rising edges or only the falling edges of the clock. In the DDR2 standard, the smallest unit of memory access is 64 bytes. In accordance with this value, the data size stored in the cache memory (the line size) is likewise set to 64 bytes to match the smallest unit of memory access with respect to the main memory.

Technology related to cache memory is disclosed in Japanese Unexamined Patent Application Publication No. 2002-278836, for example.

Meanwhile, a standard referred to as DDR3 has come into use as the third generation of DDR. Although the internal and external frequency ratio with respect to the main memory is the same as DDR2, the internal data size read from the main memory in a single cycle in DDR3 has been doubled to 128 bytes. In order to bring out the fullest potential of such DDR3, it is necessary to access the main memory at double the data size of DDR2.

As described above, if the main memory is accessed in units of 128 bytes while the cache memory line size remains at 64 bytes similarly to DDR2, then cache coherency control becomes complicated. Cache coherency control refers to processes for synchronizing recording information in the main memory with recorded information in the cache memory. Therefore, it is conceivable to expand the line size of the cache system to 128 bytes, the same number of bytes used when accessing the main memory.

However, if the line size of the cache system is expanded by a factor of two, it takes twice the number of cycles to register data in the cache memory or move out data on a line to be replaced. As the number of cache registration and move out processes increases, the pipeline becomes increasingly dominated by registration and move out processes for the cache memory. As a result, processes for reading and writing data with respect to the cache memory become less frequent on the pipeline.

SUMMARY

According to an aspect of the invention, a cache system includes primary cache memory that inputs/outputs data between a computation unit. The primary cache memory includes multi-port memories, each includes storing unit that stores unit data having a first data size, writing unit that simultaneously writes sequentially inputted plural unit data to consecutive locations of the storing unit, and outputting unit that reads out and outputs plural unit data from the storing unit. When writing data having a second data size that is a multiple of the first data size and segmented into unit data to the primary cache memory, the data is stored in different multi-port memories by writing the sequential unit data to the input port registers in a subset of the multi-port memories, and writing the sequential unit data to the input port registers in another subset of the multi-port memories.

In order to resolve the problems described above, a cache system operates as follows. When data having a second data size that is an arbitrary multiple of a first data size is segmented into unit data and written to primary cache memory, at least a first write operation and a second write operation are conducted. In the first write operation, a sequential plurality of unit data is written to the input port registers in a subset of a plurality of multi-port memory units. In the second write operation, a sequential plurality of unit data is written to the input port registers in another subset of the plurality of multi-port memory units. In so doing, the data is stored in different multi-port memory units. In addition, when reading out data from the primary cache memory, at least a first read operation and a second read operation are conducted. In the first read operation, a sequential plurality of unit data is read out from the output port registers of a subset of the plurality of multi-port memory units. In the second read operation, a sequential plurality of unit data is read out from the output port registers of the remaining subset of the plurality of multi-port memory units. In so doing, the data is read out from different multi-port memory units.

A cache system in accordance with one embodiment of the invention may include a plurality of registers used to simultaneously input data of a first data size into a plurality of multi-port memory units. In so doing, the data is written to consecutive locations in memory. As a result, the primary cache line size of the cache system can be expanded from 64 bytes to 128 bytes without changing the data bus width between the secondary cache and the primary cache, while still keeping the same processing time required for registering (and flushing) data in the primary cache. In other words, the cache utilization rate can be kept the same, even after expanding the primary cache line size.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3C illustrate the positions of primary data cache memory blocks in accordance with an embodiment;

FIG. 4 illustrates the cache way configuration of primary data cache memory in accordance with an embodiment;

FIG. 11 illustrates conversion of generated addresses;

DESCRIPTION OF EMBODIMENTS

Hereinafter, embodiments of the present invention will be described with reference to the drawings.

A cache system in accordance with an embodiment of the present invention is included in the central processing unit (hereinafter referred to as "CPU") 1 of a computer, illustrated in FIG. 1. The CPU 1 includes an instruction unit (IU) 2, an execution unit (EU) 3, primary data cache memory (L1D$) 4, primary instruction cache memory (L1I$) 5, and secondary cache memory (L2$) 6.

Figure 1:
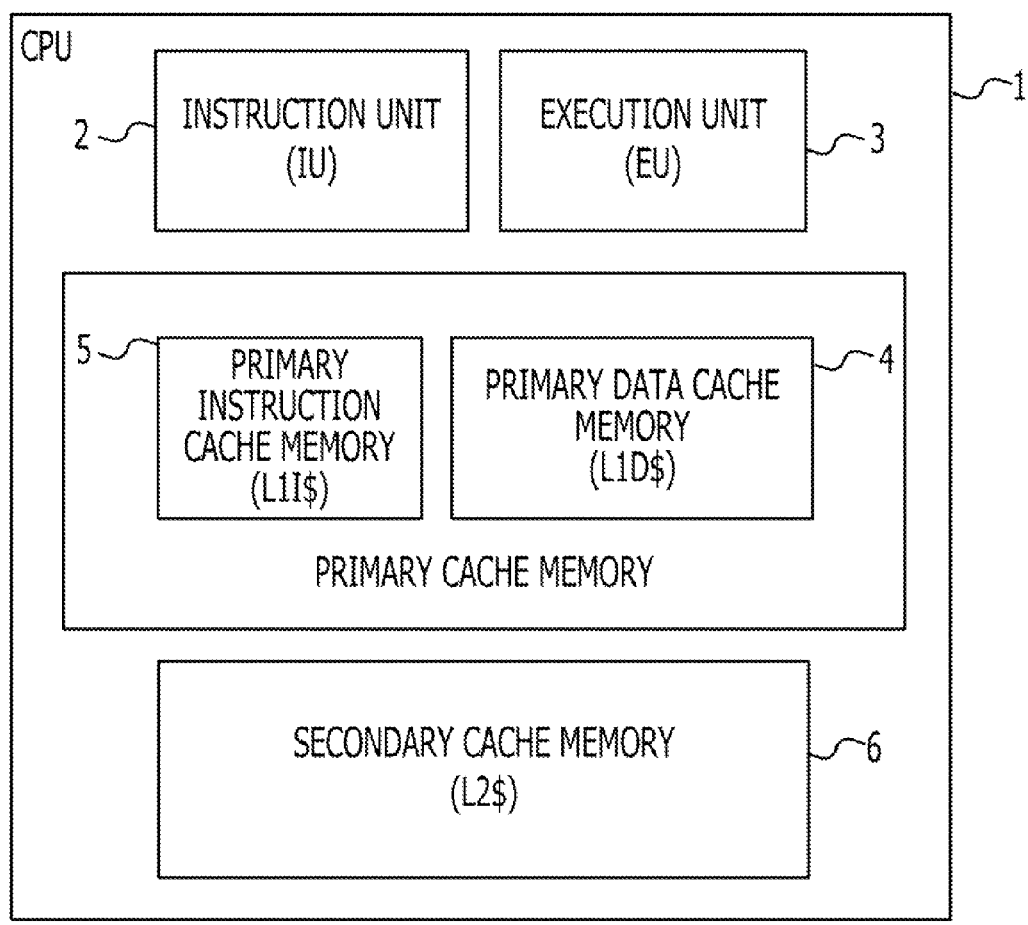
FIG. 1 illustrates a configuration of a CPU in accordance with an embodiment of the present invention.

Of the configuration illustrated in FIG. 1, the cache system includes the primary data cache memory 4, the primary instruction cache memory 5, and the secondary cache memory 6. The cache system copies a portion of the data stored in main memory (not illustrated in FIG. 1) to the primary data cache memory 4 and the secondary cache memory 6. By copying data in this way, data can be read out from the cache memory instead of the main memory when accessing data that is stored in one of the cache memories, thereby enabling fast readout of information.

FIG. 1 illustrates a configuration in which a single primary cache and a single secondary cache are provided in the CPU. However, the number of cache levels as well as the numbers of caches on each level are not limited to those of the example illustrated in FIG. 1.

The primary data cache memory 4 and the secondary cache memory 6 hold copies of the main memory. Inside the CPU 1, data is input and output between the execution unit 3 and the primary data cache memory 4.

The secondary cache memory 6 inputs and outputs data with respect to the primary data cache memory 4, as well as with respect to the main memory. The secondary cache memory 6 reads out data to be written to the primary data cache memory 4 from the main memory, and causes that data to be stored in the primary data cache memory 4.

Such primary data cache memory 4 and secondary cache memory 6 hold data that is basically the same as that in the main memory, and also write back data that has been overwritten by computations. In other words, data is written back to the main memory when storing data. Instructions and data flow through components in the following order: the main memory, secondary cache memory 6, primary data cache memory 4, and the instruction unit 2 or execution unit 3. When data is overwritten by storing data, the data is written back to the main memory in a process called a write-back.

Hereinafter, the role of the primary cache will be described. The primary instruction cache memory 5 temporarily stores instructions to be processed that have been read out from the main memory. Instructions that have been read out from the main memory and stored in the primary instruction cache memory 5 are sent to the instruction unit 2 and decoded, and then processed by the execution unit 3.

The primary data cache memory 4 temporarily stores data that has been read out from the main memory in order to read and write data for computational processes. Data that has been stored in the primary data cache memory 4 is loaded into the execution unit 3. The execution unit 3 executes computational processes using the loaded data, and causes the resulting data to be reflected in the main memory. This process is called a write-back.

The CPU 1 in FIG. 1 inputs and outputs data with respect to the main memory in units of fixed data size. For example, the width of data read out in one cycle inside the main memory may be 128 bytes. This data size corresponds to the data width that is read out in one cycle. In the present embodiment, the data width read out in one cycle is based on the standard referred to as DDR3. In the description hereinafter, an example where data is exchanged between the CPU 1 and main memory in 128-byte units will be described. However, the operation of the cache system described hereinafter is applicable to other data widths.

Figure 2:
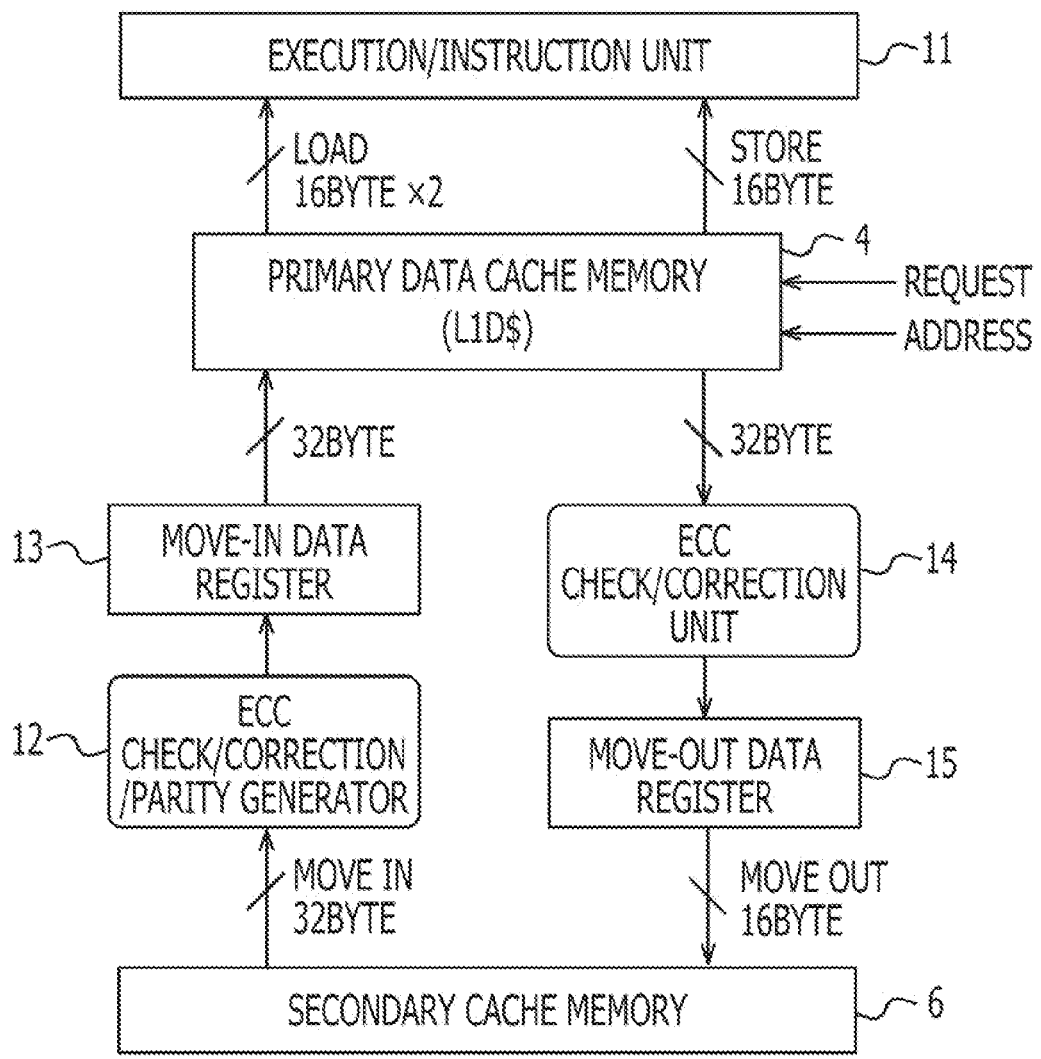
FIG. 2 illustrates a functional configuration of a CPU in accordance with an embodiment.

As illustrated in FIG. 2, for example, data widths are set for data transferred among the respective components of the CPU 1 illustrated in FIG. 1. Between the execution/instruction unit (EU/IU) 11, which includes the instruction unit 2 and the execution unit 3, and the primary data cache memory 4, data is stored and loaded using a 16-byte data width.

Meanwhile, width of the transfer bus for transferring data from the secondary cache memory 6 to the primary data cache memory 4 is 32 bytes. When data is written from the secondary cache memory 6 to the primary data cache memory 4 (during a move-in), the move-in data is read out from the secondary cache memory 6 in 32-byte units.

Move-in data read out from the secondary cache memory 6 is supplied to an ECC check/correction/parity generator 12. The ECC check/correction/parity generator 12 inspects error correction codes (hereinafter referred to as "ECC") with respect to the move-in data supplied from the secondary cache memory 6, and generates parity with respect to the move-in data. The move-in data with the parity generated from the ECC check/correction/parity generator 12 is temporarily stored in a move-in data register (hereinafter referred to as "MIDR") 13.

The move-in data stored in the move-in data register 13 is subsequently stored in the primary data cache memory 4. In FIG. 2, the move-in data stored in the move-in data register 13 is transferred to the primary data cache memory 4 using a 32-byte transfer bus width, and written to the primary data cache memory 4.

Similarly, when data stored in the primary data cache memory 4 is evacuated to the secondary cache memory 6, or in other words, when data from the primary data cache memory 4 is written to the secondary cache memory 6, the move-out data (the write data) is read out from the primary data cache memory 4 using a 32-byte transfer bus width.

Move-out data that has been read out from the primary data cache memory 4 is supplied to an ECC check/correction unit 14. The ECC check/correction unit 14 checks the ECC with respect to the move-out data sent from the primary data cache memory 4 to the secondary cache memory 6. After being subjected to error checking and correction processes, the move-out data is temporarily stored in a move-out data register (hereinafter referred to as "MODR") 15.

The move-out data stored in the move-out data register 15 is read in by the secondary cache memory 6 and stored in the secondary cache memory 6. Since width of the transfer bus between the move-out data register 15 and the secondary cache memory 6 is 16 bytes, move-out data from the move-out data register 15 is transferred and written to the secondary cache memory 6 in 16-byte units.

In this way, data transferred between the secondary cache memory 6 and the primary data cache memory 4 is protected by ECC, while data being stored in the primary data cache memory 4 is protected by parity.

In the CPU 1 operating as described above, the primary data cache memory 4 may have a line size of 128 bytes, for example, and a 2-way set associative technique may be adopted. A set associative technique involves managing a plurality of words (data) as a single block. Additionally, the line size of the primary data cache memory 4 is 128 bytes.

The line size in the primary data cache memory 4 is set to 128 bytes to match how the CPU 1 accesses the main memory in 128-byte units. In other words, the line size of the primary data cache memory 4 is taken to be same 128 bytes, which is the same as the data width between the CPU 1 and main memory, in order to avoid complicating cache coherency control between the CPU 1 and the main memory. In addition, 128-byte data is input into the primary data cache memory 4 by multi-port RAM to be hereinafter described, and the 128-byte data input from the multi-port RAM is written to consecutive locations in the primary data cache memory 4 in predetermined units of data, such as 8-byte data, for example.

The case of the primary data cache memory 4 having a plurality of dual port RAM will be described. The Dual port RAM is 1W2R-RAM, which enables data writes to be conducted using a single port, and data reads to be conducted using two ports simultaneously.

The primary data cache memory 4 of the present embodiment is illustrated in FIGS. 3A to 3C. FIG. 3A illustrates the data arrangement of way(0), FIG. 3B illustrates the data arrangement of way(1), and FIG. 3C illustrates the address layout.

In FIGS. 3A to 3C, RAM(0), RAM(1), RAM(2), and RAM(3) are respective dual port RAM modules. In the data arrangement illustrated in FIGS. 3A and 3B, the way is alternated every four blocks between a pair of RAM(0) and RAM(1), and a pair of RAM(2) and RAM(3).

FIG. 3A illustrates the data arrangement of way(0). Block 00 to block 03 of way(0) are allocated to RAM(0) and RAM(1). Meanwhile, block 04 to block 07 of way(0) are allocated to RAM(2) and RAM(3).

FIG. 3B illustrates the data arrangement of way(1). Unlike way(0), block 00 to block 03 of way(1) are allocated to RAM(2) and RAM(3), while block 04 to block 07 of way(1) are allocated to RAM(0) and RAM(1).

Also, in this way configuration in the primary data cache memory 4, index addresses (0 to n) are assigned to each even-numbered (evn) or odd-numbered (odd) block in way(0) and way(1), respectively, as illustrated in FIG. 4. FIG. 4 illustrates the index addresses that respectively correspond to the dual port RAM(0), the dual port RAM(1), the dual port RAM(2), and the dual port RAM(3) illustrated in FIGS. 3A and 3B. In FIG. 4, "w0" and "w1" indicate the way number, while "evn" and "odd" indicate whether a particular block number is even or odd.

In the primary data cache memory 4 configured in this way, sequential block numbers are formed between adjacent dual port RAM modules, or in other words, between RAM(0) and RAM(1), as well as between RAM(2) and RAM(3). As a result, when given the block arrangement illustrated in FIGS. 3A to 3C, for example, blocks 00 and 02 of a way can be read out from one dual port RAM module, while blocks 01 and 03 of that way can be simultaneously read our from another dual port RAM module.

The configuration of a dual port RAM module included in the primary data cache memory 4 described above may be like that illustrated in FIG. 5, for example. The dual port RAM 20 in FIG. 5 includes a first input port register 21a and a second input port register 21b, which are supplied with move-in data for the primary data cache memory 4 from an input port, a memory unit 22 and a first output port register 23a and a second output port register 23b. In order to keep the same number of cache registration processes as in the related art, the dual port RAM 20 illustrated in FIG. 5 is RAM equipped with 16-byte write functions.

Figure 5:
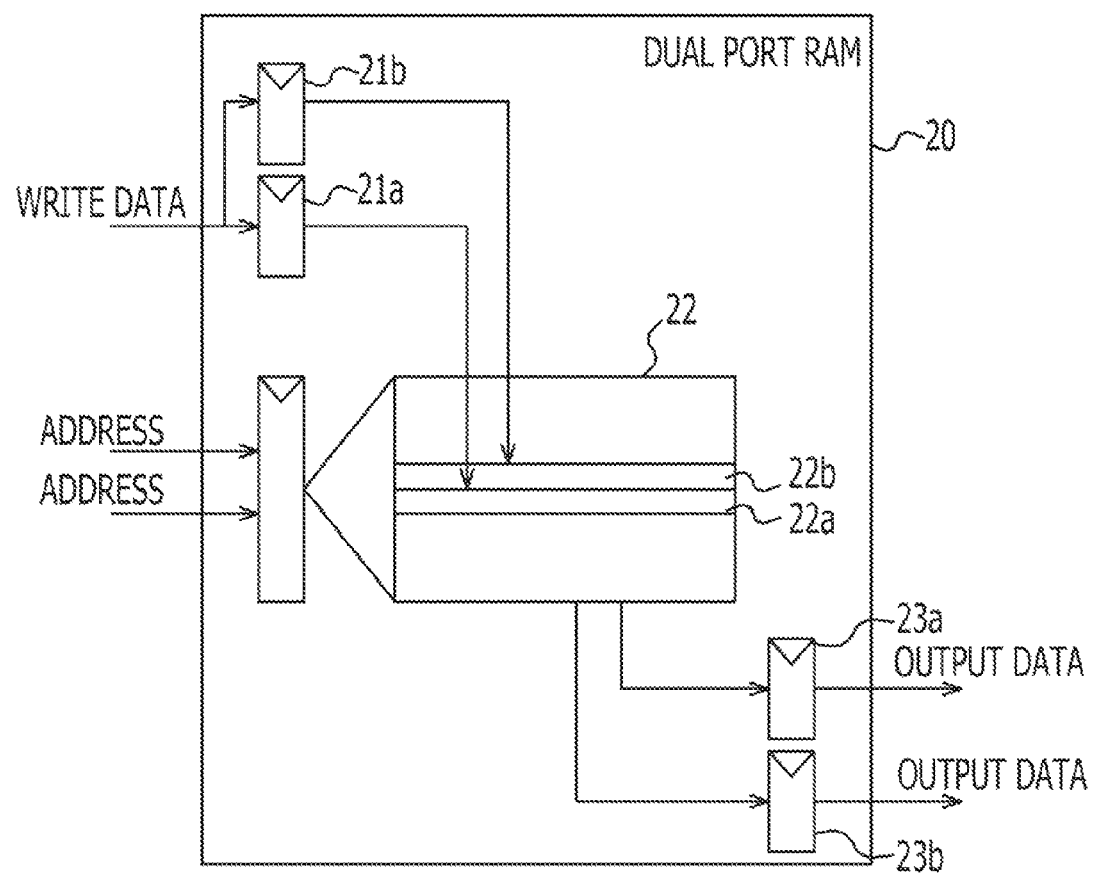
FIG. 5 illustrates a configuration of dual port RAM included in primary data cache memory in accordance with an embodiment.

In the dual port RAM 20 in FIG. 5, data is input and held in the first input port register 21a and the second input port register 21b in 8-byte units. A total of 16 bytes of data is held in the two input port registers 21a and 21b, which is then simultaneously output from the input port registers 21a and 21b, and written to the memory unit 22. Meanwhile, during a cache move-out in the dual port RAM 20 in FIG. 5, 16-byte data held in the memory unit 22 is read out and output as output data by using the two output ports 23a and 23b. In so doing, two 16-byte load instructions (SIMD) can be efficiently processed at the same time.

Data having the same data size that is input and output between the CPU 1 and the main memory, 128-byte data in this example, is input to these input port registers 21a and 21b, together with the input port registers of other dual port RAM 20. Subsequently, the input port registers 21a and 21b simultaneously write unit data corresponding to the individual blocks illustrated in FIG. 4 to consecutive locations in the memory unit 22. Four modules of such dual port RAM 20 are included in the primary data cache memory 4. Each module of dual port RAM 20 thus functions as a multi-port memory unit that includes a memory unit 22, a plurality of input port registers 21a and 21b, and a plurality of output ports.

When 8-byte move-in data is sequentially supplied to the dual port RAM 20 in FIG. 5, the first set of 8-byte move-in data is stored in the input port register 21a, and the next set of 8-byte move-in data is stored in the input port register 21b. Subsequently, once a total of 16 bytes of move-in data has been written to the first input port register 21a and the second input port register 21b, the first input port register 21a and the second input port register 21b simultaneously write the 16-byte move-in data to consecutive locations 22a and 22b in the memory unit 22. At this point, the memory unit 22 is supplied with address information, which indicates the consecutive locations 22a and 22b of the memory unit 22 where the move-in data is to be written.

In other words, when two addresses corresponding to the two input port registers 21a and 21b are input into the dual port RAM 20, the data in the input port registers 21a and 21b can be simultaneously read. However, simultaneous execution of write operations and read operations is not possible. Normally, data from the input port registers 21a and 21b can be simultaneously written to the memory unit 22 in 8-byte units. However, the input port registers 21a and 21b can be expanded by an additional 8 bytes by means of registers for writing to built-in latches. In so doing, it is possible to write to a contiguous 16-byte location in the memory unit 22. When registering data in such expanded registers made up of the input port registers 21a and 21b, normal RAM-RD operations are possible.

When reading out data stored in the memory unit 22, read addresses are supplied to the dual port RAM 20. Based on the address information supplied in advance, the dual port RAM 20 reads out 8-byte move-out data from the memory unit 22 into the first output port register 23a. Based on the address information supplied next, the dual port RAM 20 reads out 8-byte move-out data from the memory unit 22 into the second output port register 23b. The second 8-byte data follows sequentially after the move-out data that was read out above. Once 8 bytes of data has been respectively written to the first output port register 23a and the second output port register 23b for a total of 16 bytes of move-out data, the first output port register 23a and the second output port register 23b cooperate to output 8 bytes each 16-byte move-out data in total.

Four modules of the dual port RAM 20 illustrated in FIG. 5 are included in the primary data cache memory 4. When 128-byte move-in data sent and received between the CPU 1 and the main memory is registered in the primary data cache memory 4, the primary data cache memory 4 conducts the operations illustrated in the lower part of FIG. 6.

Figure 6:
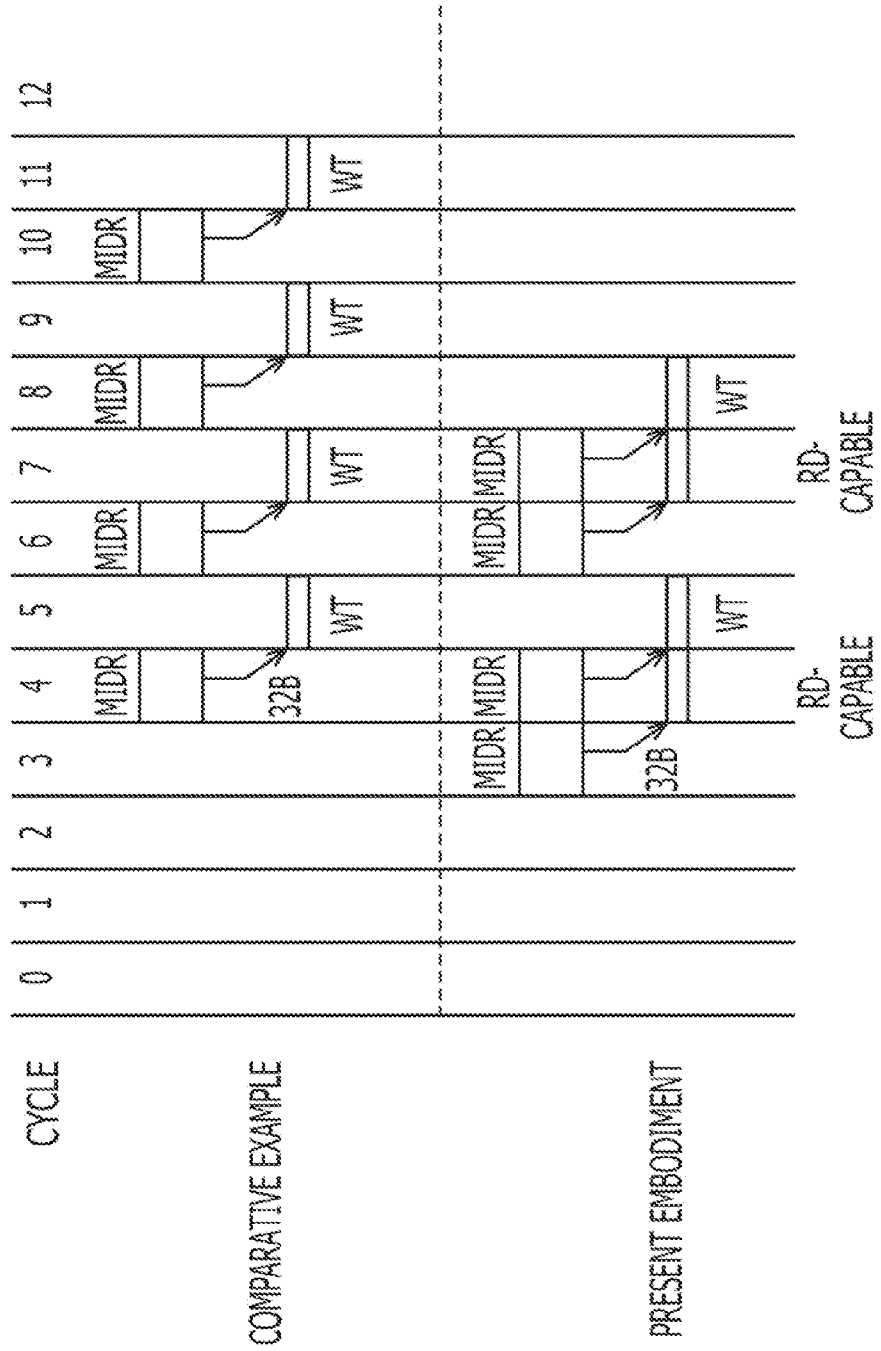
FIG. 6 illustrates a timing chart for when data is written to primary data cache memory in accordance with an embodiment.

In the third cycle of FIG. 6, the first set of move-in data MIRD (32 bytes total) is supplied to the respective input ports in the four dual port RAM modules 20. This move-in data is written to the input port register 21a of each dual port RAM module 20 in the fourth cycle of FIG. 6. At this point, each dual port RAM module 20 is in a read-capable (RD-capable) state with respect to the move-in data.

Subsequently, the next set of move-in data MIDR (32 bytes total) is supplied to the respective input ports of the four dual port RAM modules 20 in the fourth cycle of FIG. 6. This move-in data is then written to each input port register 21b in the fifth cycle of FIG. 6. At this point, each dual port RAM module 20 is in a write-capable (wt) state, and the dual port RAM modules 20 are collectively able to write a total of 64 bytes of move-in data stored in the respective input port registers 21a and 21b to the memory unit 22.

By conducting such move-in data write operations twice, once over the third cycle to the fifth cycle, and once over the sixth cycle to the eighth cycle, the primary data cache memory 4 is able to write a total of 128 bytes of move-in data. In the present embodiment, a move-in data write is thus completed in six cycles.

On the other hand, in a comparative example, two cycles are required between inputting and writing 32 bytes of move-in data. Since the following 32 bytes of move-in data is only input after the preceding 32 bytes of move-in data has been written, a 128-byte move-in data write requires eight cycles in the comparative example.

The transfer bus width between the primary data cache memory 4 and the secondary cache memory 6 is 32 bytes. Thus, when writing 128 bytes of move-in data to the primary data cache memory 4, two write operations are conducted, with 32×2 bytes of move-in data being written to the move-in data register 13 during each write operation. At this point, the preceding 64 bytes of move-in data is written during the first write operation, while the following 64 bytes of move-in data is written during the second write operation.

Herein, the transfer bus width for writing move-in data from the move-in data register 13 to the primary data cache memory 4 is also 32 bytes. When instructions for storing move-in data are issued to the four dual port RAM modules 20, each of the four dual port RAM modules 20 store 8-byte data in the first input port register 21a and the second input port register 21b, for a total of 16 bytes per module. In so doing, a total of 64 bytes of move-in data is stored in the input port registers of the four dual port RAM modules 20.

Following the write instructions, the four dual port RAM modules 20 each write 16 bytes to the memory unit 22, for a total of 64 bytes of move-in data being simultaneously written. Such a write operation for simultaneously writing 64 bytes of move-in data is conducted again with respect to the following 64 bytes of move-in data. In so doing, 128 bytes of data is written to the primary data cache memory 4.

Figure 7:
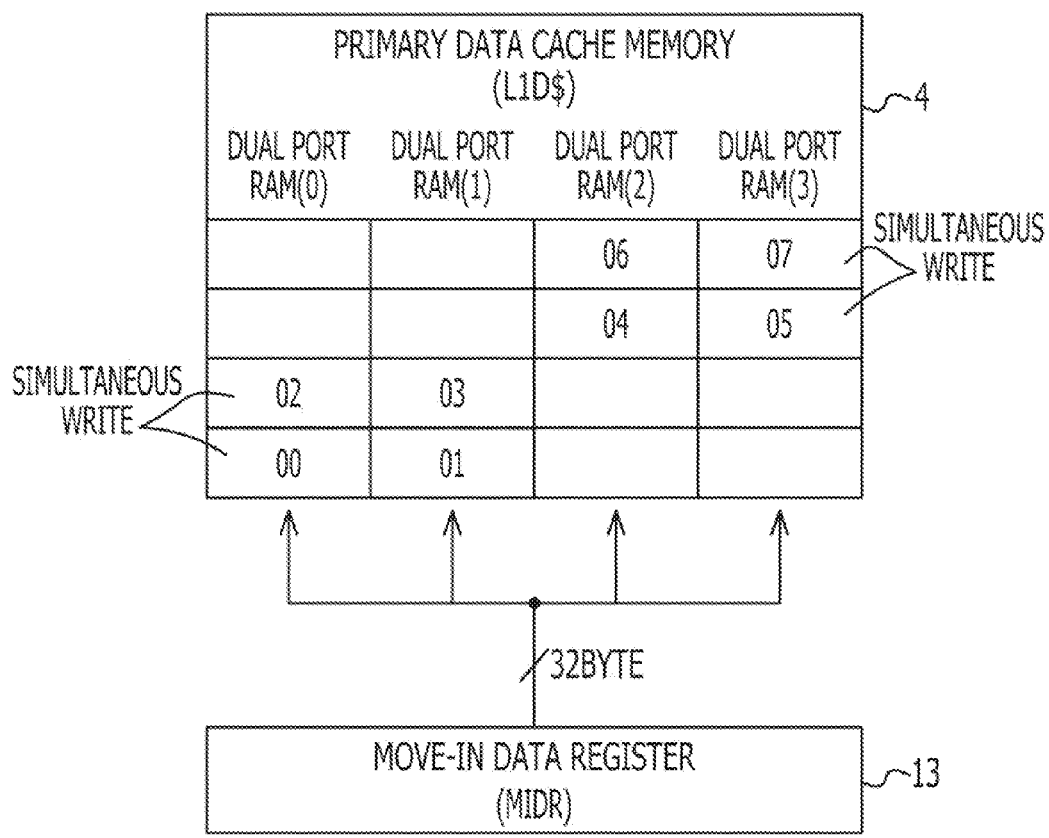
FIG. 7 illustrates an operation for writing data to primary data cache memory in accordance with an embodiment.

FIG. 7 illustrates data registration in a primary cache in accordance with the present embodiment. In FIG. 7, the size of each block from block 00 to block 07 is 8 bytes, for a total of 64 bytes among the eight blocks. When registering 128-byte data in the primary cache, a 64-byte data registration operation is executed twice.

In the case where the primary data cache memory 4 in FIG. 7 includes four dual port RAM modules RAM(0) to RAM(3), a total of 16 bytes of move-in data is written to blocks 00 and 02 of the dual port RAM module RAM(0) by the first write operation. At the same time, a total of 16 bytes of move-in data is written to blocks 04 and 06 of the dual port RAM module RAM(2). Additionally, a total of 16 bytes of move-in data is written to blocks 01 and 03 of the dual port RAM module RAM(1) by the next write operation for the first set of move-in data. At the same time, a total of 16 bytes of move-in data is written to blocks 05 and 07 of the dual port RAM module RAM(3). In so doing, a total of 64 bytes of move-in data is written to the primary cache.

Similarly, a total of 16 bytes of move-in data is written to blocks 00 and 02 of the dual port RAM module RAM(0) by the second write operation that corresponds to the following 64 bytes of move-in data. At the same time, a total of 16 bytes of move-in data is written to blocks 04 and 06 of the dual port RAM module RAM(2). Additionally, a total of 16 bytes of move-in data is written to blocks 01 and 03 of the dual port RAM module RAM(1) by the second write operation for the following move-in data. At the same time, a total of 16 bytes of move-in data is written to blocks 05 and 07 of the dual port RAM module RAM(3). As a result of the above two write operations, a total of 128 bytes of move-in data is written to the primary cache.

In this way, with just two write operations, the primary data cache memory 4 is able to write 128-byte data. In other words, the line size of the primary cache can be expanded from 64 bytes to 128 bytes without changing the data bus width between the secondary cache and the primary cache, while keeping the same number of processes required for cache registration and flushing. In other words, the cache utilization rate can be kept the same, even after expanding the primary cache line size.

When data that has been written to the primary data cache memory 4 is read out and moved out to the secondary cache memory 6, the first output port register 23a and the second output port register 23b of the dual port RAM 20 are used.

Figure 8:
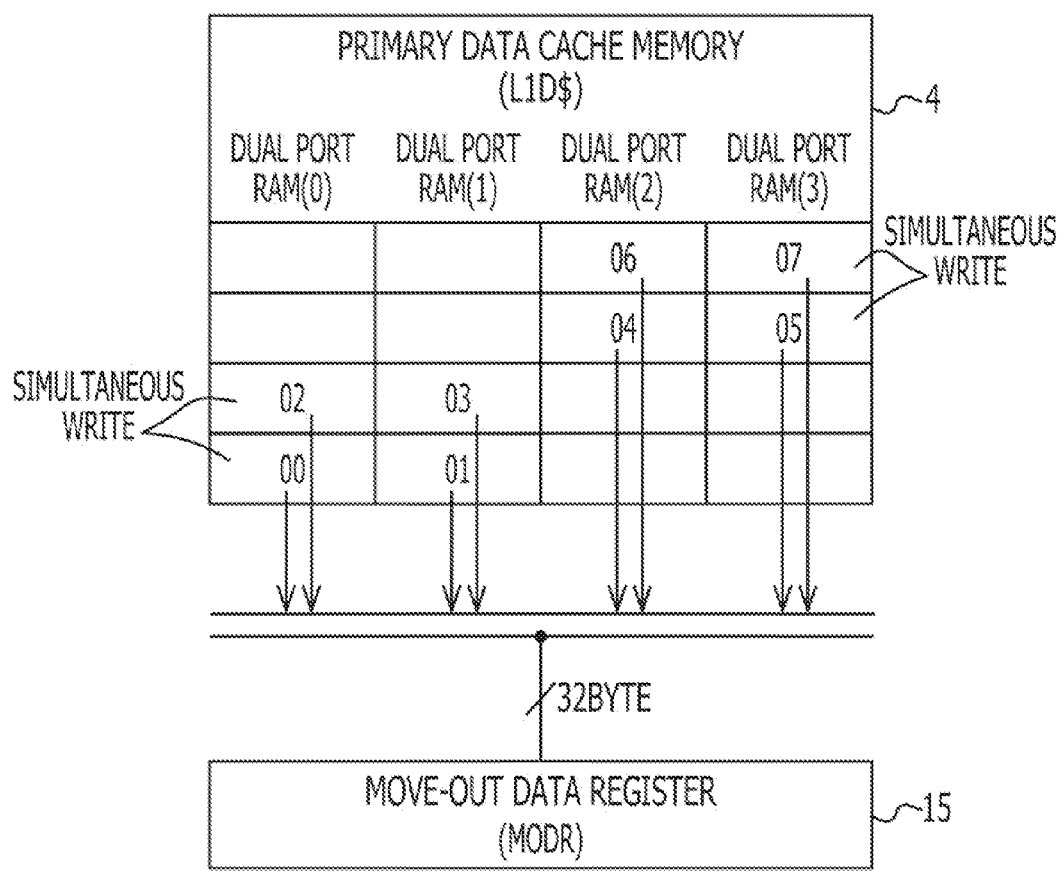
FIG. 8 illustrates an operation for reading data from primary data cache memory in accordance with an embodiment.

FIG. 8 is a diagram for explaining data write-back from the primary cache, or in other words, move-out operation. As illustrated in FIG. 8, by means of a first move-out data read operation, a total of 16 bytes of move-out data is read out from blocks 00 and 02 of the dual port RAM module RAM(0). At the same time, a total of 16 bytes of move-out data is read out from blocks 04 and 06 of the dual port RAM module RAM(2). In so doing, a total of 32 bytes of move-out data is read out from the dual port RAM. In addition, by means of the next read operation, a total of 16 bytes of move-out data is read out from blocks 01 and 03 of the dual port RAM module RAM(1). At the same time, a total of 16 bytes of move-out data is read out from blocks 07 and 05 of the dual port RAM module RAM(3). By these two read operations, a total of 64 bytes of move-out data is read out.

Similarly, by a second read operation, a total of 16 bytes of move-out data is read out from blocks 00 and 02 of the dual port RAM module RAM(0). At the same time, a total of 16 bytes of move-out data is read out from blocks 04 and 06 of the dual port RAM module RAM(2). In addition, by the next second read operation, a total of 16 bytes of move-out data is read out from blocks 01 and 03 of the dual port RAM module RAM(1). At the same time, a total of 16 bytes of move-out data is read out from blocks 07 and 05 of the dual port RAM module RAM(3). By these two read operations, a total of 128 bytes of move-out data is read out.

At this point, the four sets of 32-byte data read out from the four dual port RAM modules 20 are respectively stored in the first output port register 23a of each dual port RAM module 20, while the next four sets of 32-byte data are respectively stored in the second output port register 23b of each dual port RAM module 20. These 32-byte chunks of data stored in the output port registers are read into the move-out data register 15 as move-out data in two operations. By conducting this move-out data read operation twice, a total of 128 bytes of move-out data is supplied to the move-out data register 15.

Figure 9:
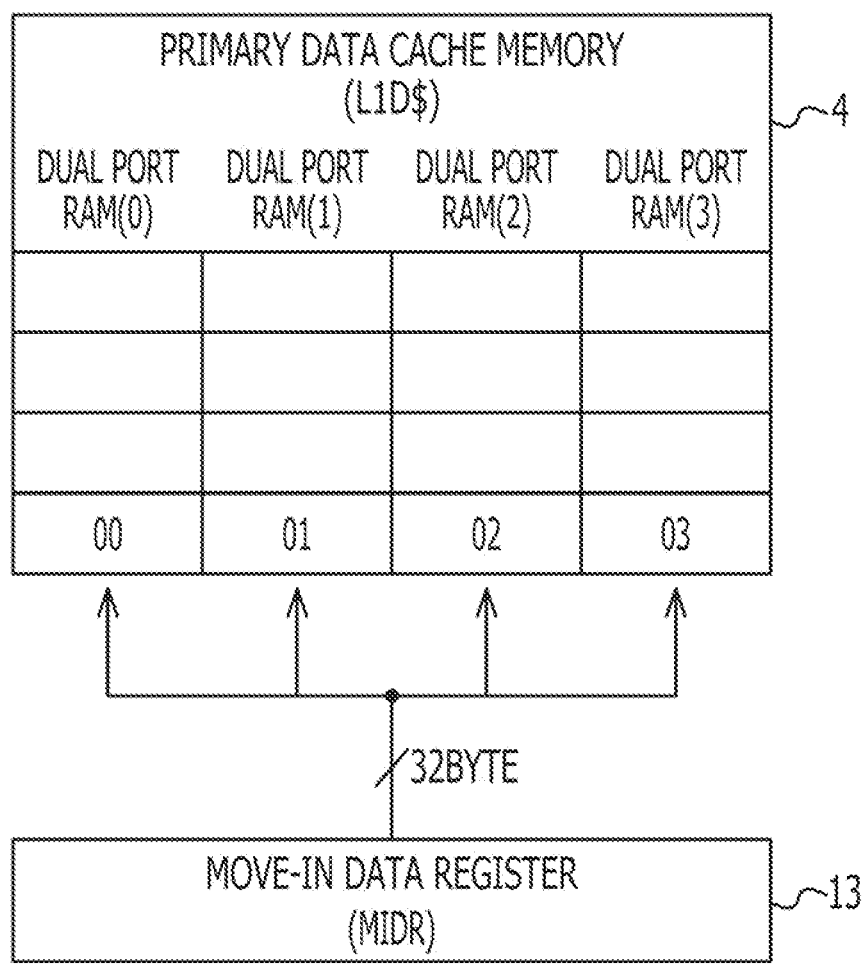
FIG. 9 illustrates an operation for writing data to primary data cache memory in accordance with a comparative example.

On the other hand, consider the comparative example illustrated in the upper part of FIG. 6 and in FIG. 9, wherein the primary data cache memory has a line size of 64 bytes, and conducts data write operations 32 bytes at a time. When the primary data cache memory in this comparative example writes 128-byte data, 32 bytes of move-in data is written to the move-in data register. Then, 32 bytes of move-in data is written to the primary data cache memory for a total of four times.

In the comparative example illustrated in the upper part of FIG. 6, registering a 128-byte cache line in the primary cache involves issuing a move-in request four times and registering the move-in data in the cache. Thus, the pipeline utilization rate of the move-in requests is doubled compared to the embodiment. Consequently, a function (a 16-byte write function) for simultaneous writing to consecutive locations (2 index) is provided with respect to the dual port RAM 20. In so doing, it becomes possible to use the four dual port RAM modules 20 to write 64 bytes of data with a single move-in request, as in the present embodiment in the lower part of FIG. 6. As a result, in the comparative example, a move-in request must be issued four times in order to register a 128-byte cache line, whereas in the present embodiment, the same can be accomplished by issuing a move-in request just two times.

In addition, when a move-out request is issued in the present embodiment, 64 bytes of data (half the line size) is read out from the secondary cache memory 6. The read out data is first registered in the output port registers, and then sent to the move-out data register 15 four times, with 32 bytes sent at a time. The cache access involves two accesses of 64 bytes, and thus pipeline utilization by move-out requests is unchanged from the comparative example in FIG. 9.

According to the above cache system, the line size of the primary cache can be expanded from 64 bytes to 128 bytes without changing the data bus width between the secondary cache and the primary cache, while keeping the same cache utilization rate for registration and flushing operations with respect to the primary cache. In other words, 128-byte data can be written to the primary data cache memory 4 while maintaining the cache utilization rate for registration and flushing operation with respect to the primary cache, and without changing the transfer bus width. Consequently, according to the cache system of the present embodiment, even if the data width between the CPU 1 and the main memory is increased, the line size can be matched to that data width, and data reads and writes can be conducted by a plurality of dual port RAM modules 20.

Next, the reading and writing of data with respect to the primary data cache memory 4 using units of particular data size in the CPU 1 will be described. In the description hereinafter, an example is described wherein the instructions loaded into the execution/instruction unit 11 are SIMD (Single Instruction/Multiple Data) instructions, and data is written and read out in units of a particular data size in accordance with these instructions.

If SIMD instructions are used, then a plurality of data is simultaneously processed by the CPU 1 by a single SIMD instruction. For example, when a single SIMD instruction occurs, 16 bytes of sequential data may be written to or read out from the primary data cache memory 4. Herein, 16 bytes is considered to be the "data size".

The writing of 16-byte data to the primary data cache memory 4 in accordance with an SIMD instruction is conducted with respect to consecutive locations in the dual port RAM 20. At this point, each dual port RAM module 20 included in the primary data cache memory 4 stored 8 bytes of data in the first input port register 21a and the second input port register 21b, respectively, and the two sets of 8-byte data are simultaneously written to consecutive locations in the memory unit 22. In so doing, 16-byte data is written to each dual port RAM module 20 in accordance with an SIMD instruction.

In the case of following an SIMD instruction to read out 16-byte data that was has been written to the memory unit 22 of the dual port RAM 20, addresses are specified with respect to the primary data cache memory 4 that correspond to the boundaries of blocks delimited every 8 bytes. For example, in the way configuration illustrated in FIG. 4, data stored in the dual port RAM module RAM(0) and data stored in the dual port RAM module RAM(1) constitute sequential 16-byte data. This sequential 16-byte data is then read out, being made up of the data stored as way number (0), index address (0) of the dual port RAM module RAM(0), as well as the data stored as way number (0), index address (0) of the dual port RAM module RAM(1).

In this way, when reading out 16-byte data that straddles two blocks, the read address of the data in the dual port RAM module RAM(0) is shifted one block away from the address for accessing the block in the dual port RAM module RAM(1). In addition, in each dual port RAM module 20, it is necessary to read out 16-byte data straddling two blocks (a line cross).

Figure 10:
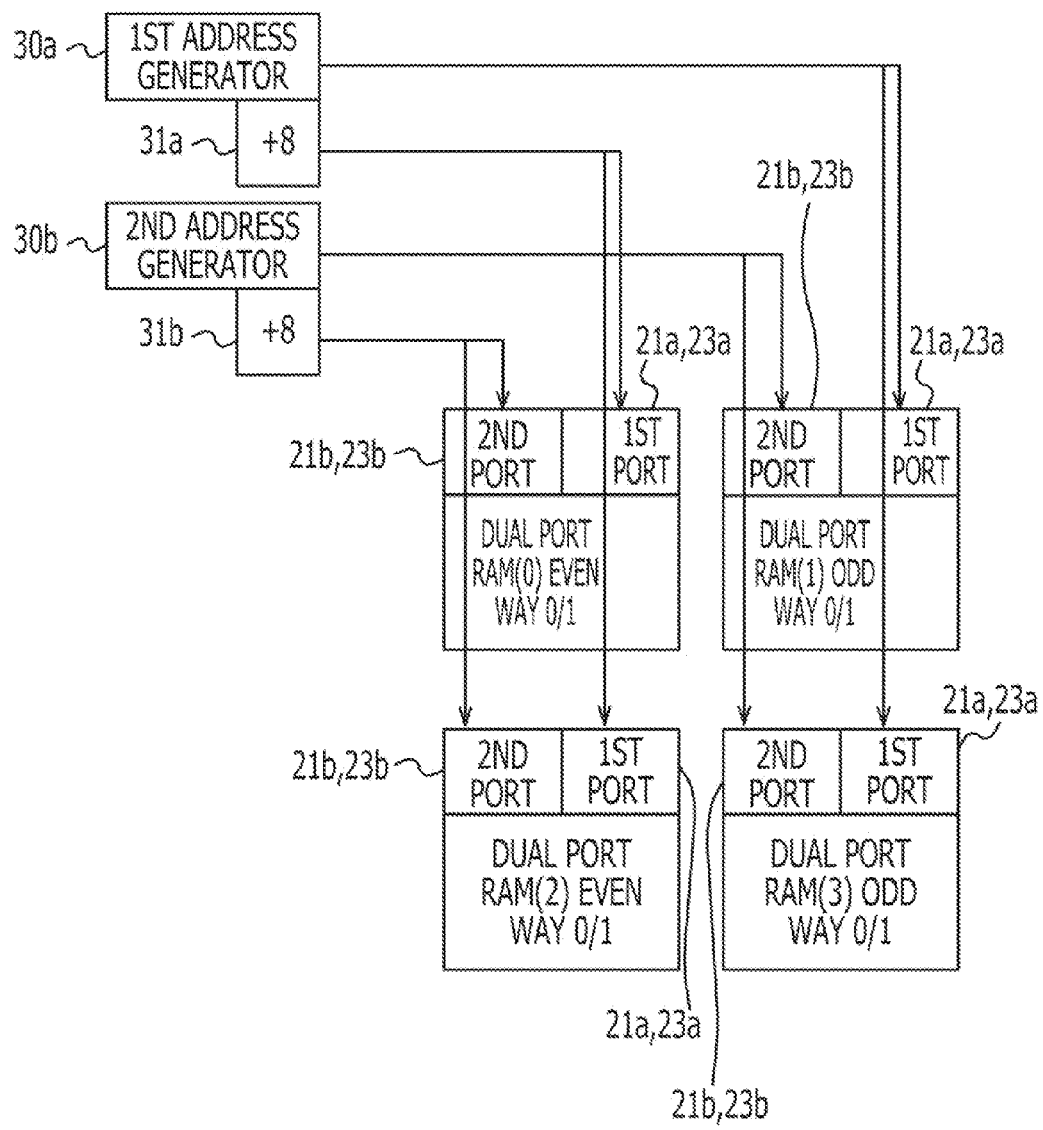
FIG. 10 illustrates how addresses are given to primary data cache memory when reading out data from primary data cache memory in accordance with an embodiment.

In order to read out such sequential 16-byte data, the cache system includes the configuration illustrated in FIG. 10. According to FIG. 10, the cache system includes a first address generator 30a and a first address converter 31a, as well as a second address generator 30b and a second address converter 31b. The first address generator 30a generates address information for data to be read out into the respective first input port register 21a and the first output port register 23a of the dual port RAM modules RAM(1) and RAM(3). The second address generator 30b generates address information for data to be read out into the respective second input port register 21b and the second output port register 23b of the dual port RAM modules RAM(1) and RAM(3).

The first address converter 31a generates address information for data to be read out into the respective first input port register 21a and the first output port register 23a of the dual port RAM modules RAM(0) and RAM(2). The second address converter 31b generates address information for data to be read out into the respective second input port register 21b and the second output port register 23b of the dual port RAM modules RAM(0) and RAM(2).

Following instructions from the execution/instruction unit 11, the first address generator 30a and the second address generator 30b generate addresses for data to be read out from the primary data cache memory 4. The first address converter 31a and the second address converter 31b take the addresses generated by the first address generator 30a and the second address generator 30b, and convert the addresses as follows.

The virtual address VA(N[k bytes]) generated by the first address generator 30a and the second address generator 30b may be converted as illustrated in FIG. 11, for example. FIG. 11 illustrates relationships between generated addresses and converted addresses. Herein, virtual addresses are taken to be used for both the generated addresses and the converted addresses. In addition, in FIG. 11, each address is expressed in hexadecimal. Furthermore, the generated address VA(1) is an upper address, while VA(2) is a lower address. Similarly, the converted address VA(3) is an upper address, while VA(4) is a lower address.

In the case where the address [1000] is generated by the first address generator 30a and the second address generator 30b, the first address converter 31a and the second address converter 31b convert the address into the address [1008]. In addition, in the case where the address [1008] is generated by the first address generator 30a and the second address generator 30b, the first address converter 31a and the second address converter 31b convert the address into the address [1010]. This is because the locations to be accessed on the even side illustrated in FIG. 10 are at address locations one index address higher than the locations to be accessed on the odd side.

In the example in FIG. 10, the first address converter 31a and the second address converter 31b convert addresses by adding 8, a value equivalent to one index address, to the addresses generated by the first address generator 30a and the second address generator 30b.

When four dual port RAM modules are included in the primary data cache memory 4 as in FIG. 10, addresses are supplied for reading out data with respect to the first output port register 23a and the second output port register 23b in each dual port RAM module.

Figure 12:
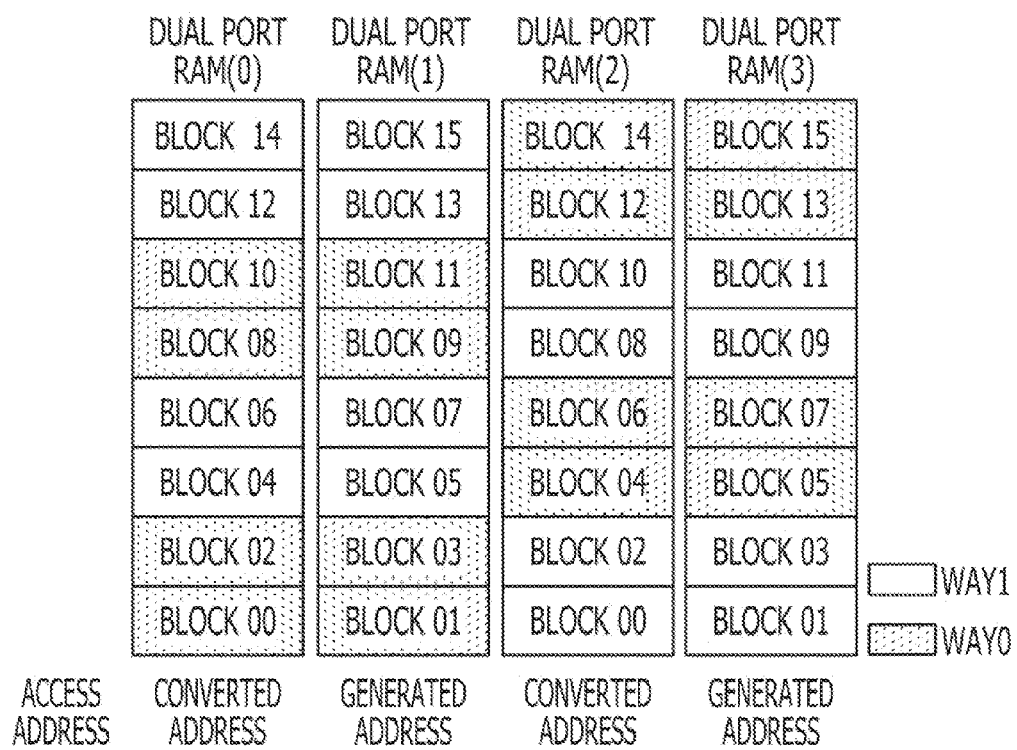
FIG. 12 illustrates the relationship between supplied addresses and blocks for each module of dual port RAM.

Subsequently, as illustrated in FIG. 12, the addresses generated by the first address generator 30a and the second address generator 30b are supplied to the dual port RAM modules RAM(1) and RAM(3). In addition, the converted addresses output by the first address converter 31a and the second address converter 31b are respectively supplied to the dual port RAM modules RAM(0) and RAM(2), which store the data continuing sequentially after the data stored in the dual port RAM modules RAM(1) and RAM(3) that were supplied with the addresses generated by the first address generator 30a and the second address generator 30b.

In FIG. 10, the first address generator 30a generates an address specifying an arbitrary block contained in the dual port RAM module RAM(1). The address generated by the first address generator 30a is supplied to the first port registers 21a and 23a of the dual port RAM module RAM(1). In addition, the first address converter 31a converts the generated address into the address for the block storing the data continuing sequentially after the data stored in the block of the dual port RAM module RAM(1) that was specified by the first address generator 30a. The converted address is supplied to the first port registers 21a and 23a of the dual port RAM module RAM(0).

Similarly, the address generated by the first address generator 30a specifies an arbitrary block in the dual port RAM module RAM(3), and is supplied to the first port registers 21a and 23a of the dual port RAM module RAM(3). Also, the converted address output by the first address converter 31a is the address for the block storing the data continuing sequentially after the data stored in the block of the dual port RAM module RAM(3) that was specified by the first address generator 30a. The converted address is supplied to the first port registers 21a and 23a of the dual port RAM module RAM(2).

Meanwhile, the second address generator 30b generates an address specifying an arbitrary block contained in the dual port RAM module RAM(1). The address generated by the second address generator 30b is then supplied to the dual port RAM module RAM(1). In addition, the second address converter 31b converts the generated address into the address for the block storing the data continuing sequentially after the data stored in the block of the dual port RAM module RAM(1) that was specified by the second address generator 30b. This address is supplied to the second port registers 21b and 23b of the dual port RAM module RAM(0).

Similarly, the address generated by the second address generator 30b specifies an arbitrary block in the dual port RAM module RAM(3), and is supplied to the second port registers 21b and 23b of the dual port RAM module RAM(3). Also, the converted address output by the second address converter 31b is the address for the block storing the data continuing sequentially after the data stored in the block of the dual port RAM module RAM(3) that was specified by the second address generator 30b. The converted address is supplied to the second port registers 21b and 23b of the dual port RAM module RAM(2).

As a result, by following SIMD instructions, the blocks storing 16-byte data can be accessed. A specific example is given below.

Assume that a virtual address VA is generated by the first address generator 30a and the second address generator 30b.

First, an example will be given wherein VA=0x000. When the 16-byte data is loaded into the first output port register 23a, the address generated by the first address generator 30a is VA(2)=0, as illustrated in FIG. 11. In contrast, when the address is converted by the first address converter 31a, the converted address is VA(4)=8.

Figure 13:
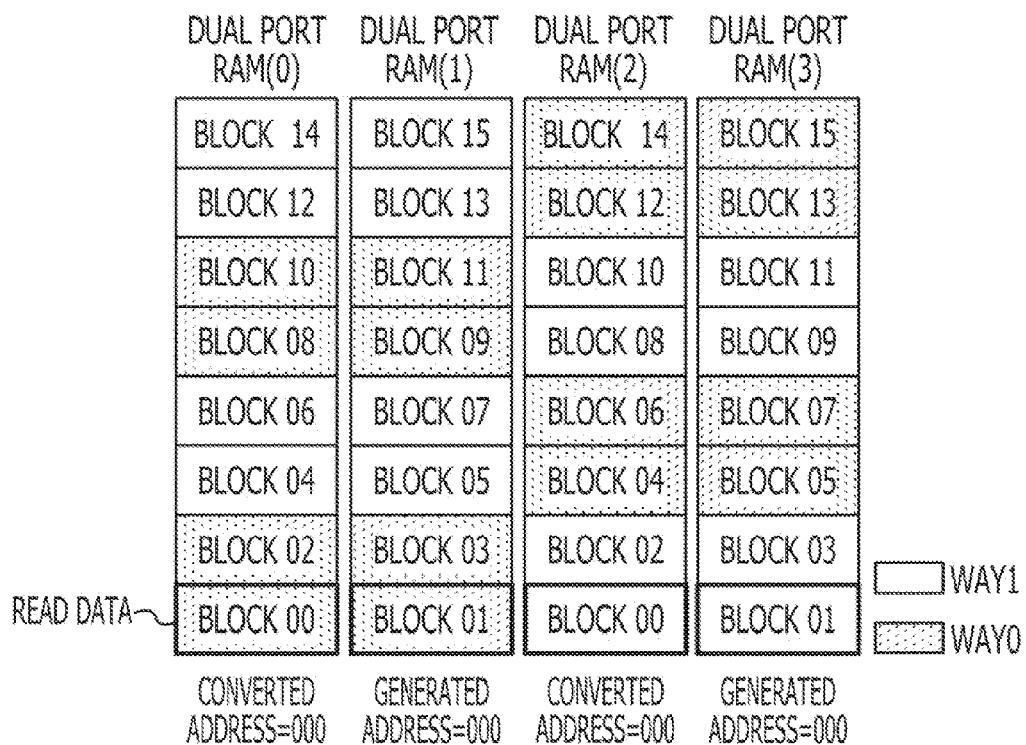
FIG. 13 illustrates an operation for reading out data with respect to individual dual port RAM modules by means of generated addresses and converted addresses.

As a result, the data indicated in bold in FIG. 13 can be read out. In other words, the sequential 16-byte data in block 00 of the dual port RAM module RAM(0) and block 01 of the dual port RAM module RAM(1) is read out, while in addition, the sequential 16-byte data in block 00 of the dual port RAM module RAM(2) and block 01 of the dual port RAM module RAM(3) is read out.

At this point, once the first address generator 30a generates an address specifying block 01 of the dual port RAM module RAM(1), the address is converted by the first address converter 31a to obtain an address specifying block 00 of the dual port RAM module RAM(0). For example, in the case where the generated address is [0], the converted address becomes [8]. Also, once the second address generator 30b generates an address specifying block 01 of the dual port RAM module RAM(3), the address is converted by the second address converter 31b to obtain an address specifying block 00 of the dual port RAM module RAM(2). In so doing, blocks 00 and 01 of way(0) and way(1) can be read out from the primary data cache memory 4.

Herein, "Address=000" in FIG. 13 is equivalent to VA(1) and VA(3) in FIG. 11. The above similarly applies to the drawings hereinafter.

Consider also the case where 16-byte data is loaded into the first output port register 23a with VA=0x008. In this case, the address generated by the first address generator 30a is VA(1)= 000, while the converted address output by the first address converter 31a is VA(3)=001, as illustrated in FIG. 11.

Figure 14:
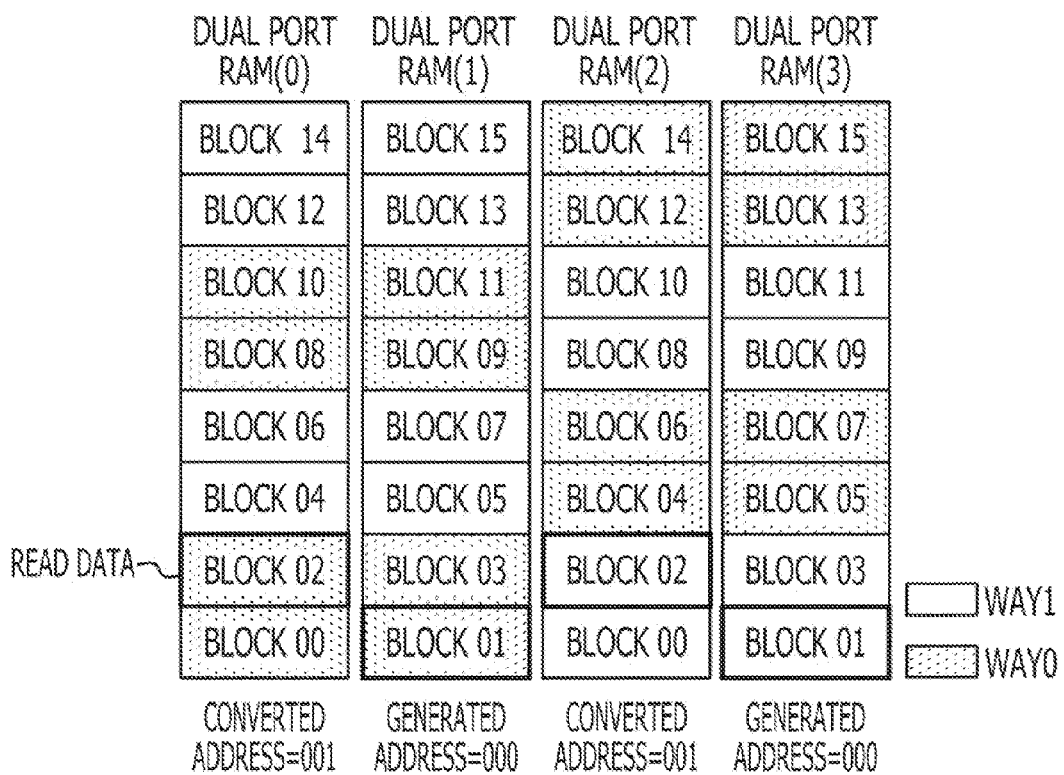
FIG. 14 illustrates an operation for reading out data with respect to individual dual port RAM modules by means of generated addresses and converted addresses.

As a result, the data indicated in bold in FIG. 14 can be read out. In other words, the sequential 16-byte data in block 01 of the dual port RAM module RAM(1) and block 02 of the dual port RAM module RAM(0) is read out, while in addition, the sequential 16-byte data in block 01 of the dual port RAM module RAM(3) and block 02 of the dual port RAM module RAM(2) is read out.

At this point, once the first address generator 30a generates an address specifying block 01 of the dual port RAM module RAM(1), the address is converted by the first address converter 31a to obtain an address specifying block 02 of the dual port RAM module RAM(0). Also, once the second address generator 30b generates an address specifying block 01 of the dual port RAM module RAM(3), the address is converted by the second address converter 31b to obtain an address specifying block 02 of the dual port RAM module RAM(2). In so doing, blocks 01 and 02 of way(0) and way(1) can be read out from the primary data cache memory 4.

Additionally, consider the case where 16-byte data is loaded into the first output port register 23a with VA=0x018. In this case, the address generated by the first address generator 30a is VA(1)=001, while the converted address output by the first address converter 31a is VA(3)=002, as illustrated in FIG. 11.

Figure 15:
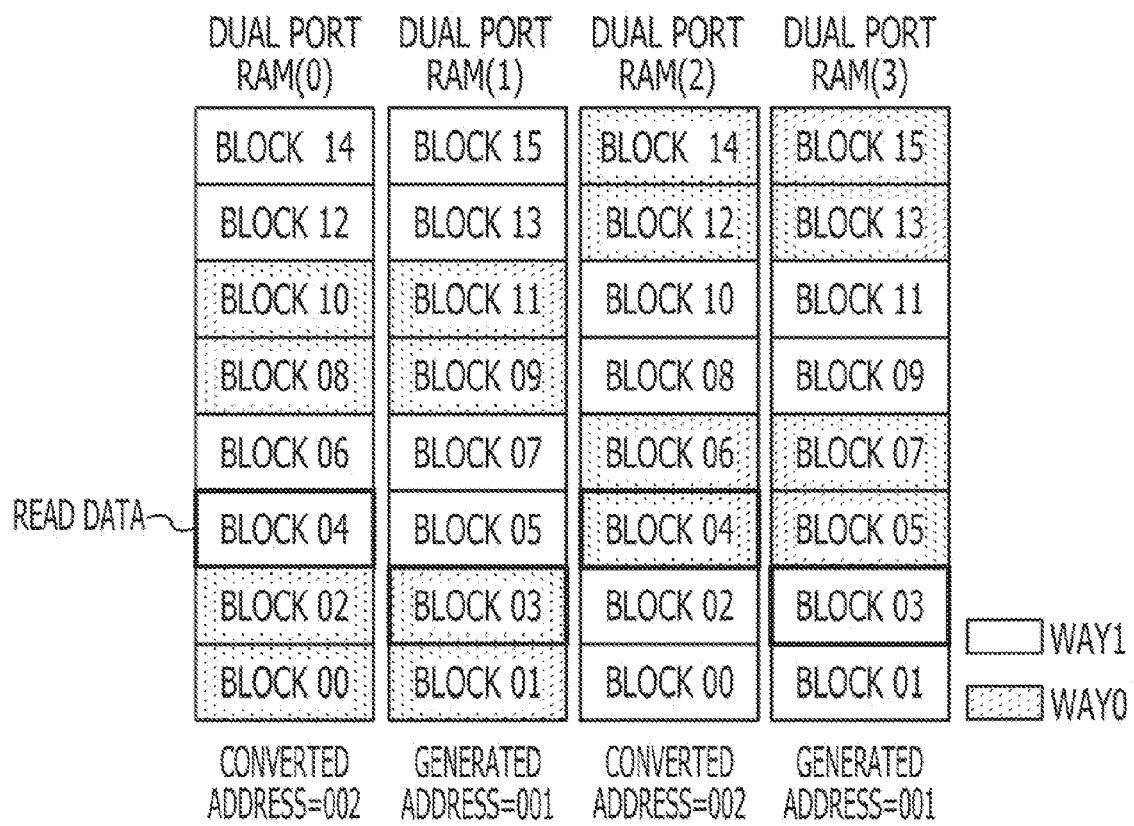
FIG. 15 illustrates an operation for reading out data with respect to individual dual port RAM by means of generated addresses and converted addresses.

As a result, the data indicated in bold in FIG. 15 can be read out. In other words, the sequential 16-byte data in block 03 of the dual port RAM module RAM(1) and block 04 of the dual port RAM module RAM(0) is read out, while in addition, the sequential 16-byte data in block 03 of the dual port RAM module RAM(3) and block 04 of the dual port RAM module RAM(2) is read out.

At this point, once the first address generator 30a generates an address specifying block 03 corresponding to way(0) of the dual port RAM module RAM(1), the address is converted by the first address converter 31a to obtain an address specifying block 04 corresponding to way(1) of the dual port RAM module RAM(0). Also, once the second address generator 30b generates an address specifying block 03 corresponding to way(1) of the dual port RAM module RAM(3), the address is converted by the second address converter 31b to obtain an address specifying block 04 corresponding to way(0) of the dual port RAM module RAM(2). In so doing, blocks 03 and 04 of way(0) and way(1) can be read out from the primary data cache memory 4.

In this way, data of a given data size (16-byte data) is split up and written to consecutive blocks on different dual port RAM modules. Subsequently, addresses generated by the address generators 30a and 30b can be used to read out parts of the data of a given data size, while in addition, converted addresses output by the address converters 31a and 31b can be used to read out the remaining parts of the data of a given data size. Consequently, sequential 16-byte data can be read out by two dual port RAM modules respectively provided with a memory unit 22 having an 8-byte block configuration, even in the case where the sequential 16-byte data is loaded by following SIMD instructions.

Next, a configuration will be described wherein 16-byte data is read out from the primary data cache memory 4 and output to the execution/instruction unit 11 by following SIMD instructions.

Figure 16:
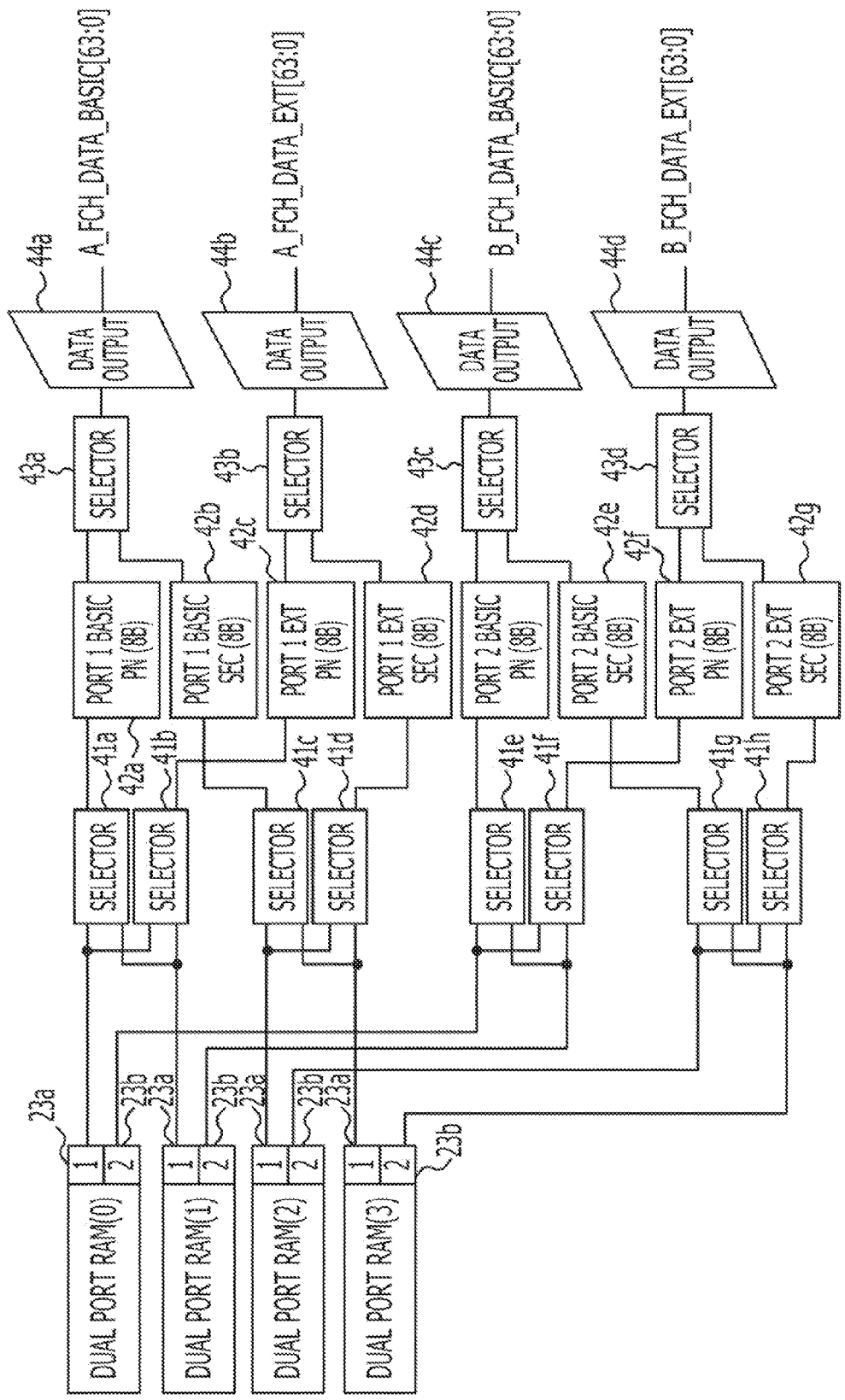
FIG. 16 illustrates a configuration in which 16-byte data is supplied from a plurality of dual port RAM modules to an execution/instruction unit.

FIG. 16 illustrates a configuration wherein 8-byte unit data delimited by block numbers is selected, and two sets of 8-byte data are sequentially output to the execution/instruction unit 11. The cache system is provided with selectors 41a to 41h, which accept as input the 8-byte data output from the first output port register 23a and the second output port register 23b in each of the dual port RAM modules RAM(0) to RAM (3). Based on addresses supplied from the first address generator 30a, the second address generator 30b, the first address converter 31a and the second address converter 31b, the selectors 41a to 41h select some 8-byte data output from the dual port RAM connected thereto. Subsequently, selectors 43a to 43d select the 8-byte data stored in the memory units 22 of the dual port RAM, and sequentially output to the execution/instruction unit 11 as 16-byte data.

More specifically, the first output port registers 23a in the dual port RAM modules RAM(0) and RAM(1) are respectively connected to the two selectors 41a and 41b. Similarly, the first output port registers 23a in the dual port RAM modules RAM(2) and RAM(3) are respectively connected to the two selectors 41c and 41d. Likewise, the second output port registers 23b in the dual port RAM modules RAM(0) and RAM(1) are respectively connected to the two selectors 41e and 41f, while the second output port registers 23b in the dual port RAM modules RAM(2) and RAM(3) are respectively connected to the two selectors 41g and 41h.

A buffer 42a is connected to the selector 41a, a buffer 42c to the selector 41b, a buffer 42b to the selector 41c, and a buffer 42d to the selector 41d. In addition, a buffer 42e is connected to the selector 41e, a buffer 42g to the selector 41f, a buffer 42f to the selector 41g, and a buffer 42h to the selector 41h.

The respective sets of 8-byte data stored in the buffer 42a and the buffer 42b are selected in that order by the selector 43a, and supplied to the execution/instruction unit 11 as 16-byte data via a data output unit 44a. Similarly, the 8-byte data respectively stored in the buffer 42c and the buffer 42d is selected by the selector 43b, and supplied to a data output unit 44b.

The data output unit 44b rearranges the data output from the selector 43b in sequential order, and supplies the result to the execution/instruction unit 11 as 16-byte data. Similarly, the 8-byte data respectively stored in the buffer 42e and the buffer 42f is supplied to the execution/instruction unit 11 as 16-byte data via the selector 43c and the output data unit 44c. The 8-byte data respectively stored in the buffer 42g and the buffer 42h is supplied to the execution/instruction unit 11 as 16-byte data via the selector 43d and the data output unit 44d.

By configuring a cache system in this way, 8-byte data respectively output from first output port registers 23a and the second output port registers 23b of the dual port RAM modules RAM(0) to RAM(3) is selected by the selectors 41a to 41h. In addition, data belonging to the same way but output from different dual port RAM modules is selected by the selectors 43a to 43d.

In so doing, the selectors 41a and 41b each select 8-byte data output from the first output port register 23a of either the dual port RAM module RAM(0) or RAM(1). Similarly, the selectors 41c and 41d each select 8-byte data output from the first output port register 23a of either the dual port RAM module RAM(2) or RAM(3).

The data from either the dual port RAM module RAM(0) or RAM(1) is stored in the buffer 42a, while the data from either the dual port RAM module RAM(2) or RAM(3) is stored in the buffer 42b.

The selector 43a selects one of the following: the 8-byte data from the dual port RAM module RAM(0) or RAM(1) that was output from the selector 41a; or the 8-byte data from the dual port RAM module RAM(2) or RAM(3) that was output from the selector 41c. The selector 43b connected to the buffer 42c and the buffer 42d operates similarly to the selector 43a. In addition, besides being connected to the second output port registers of the respective dual port RAM modules, fundamentally the selectors 41e to 41h operate similarly to the selectors 41a to 41d. The selector 43c and the selector 43d operate similarly to the selectors 43a and 43b.

In this way, by reading out 8-byte data from different dual port RAM modules 20, the cache system of an embodiment is able to generate 16-byte data to be read out by following SIMD instructions, and then output that data to the execution/instruction unit 11. In addition, even if the 16-byte data is stored straddling different ways, this cache system is able to read out 8-byte data from the output ports of all dual port RAM modules, and select 8-byte data in accordance with specified addresses. In so doing, this cache system is able to output 16-byte data by a simple pattern layout compared to the case where data is selected on a per-way basis after determining the way of the data to be read out.

Figure 17:
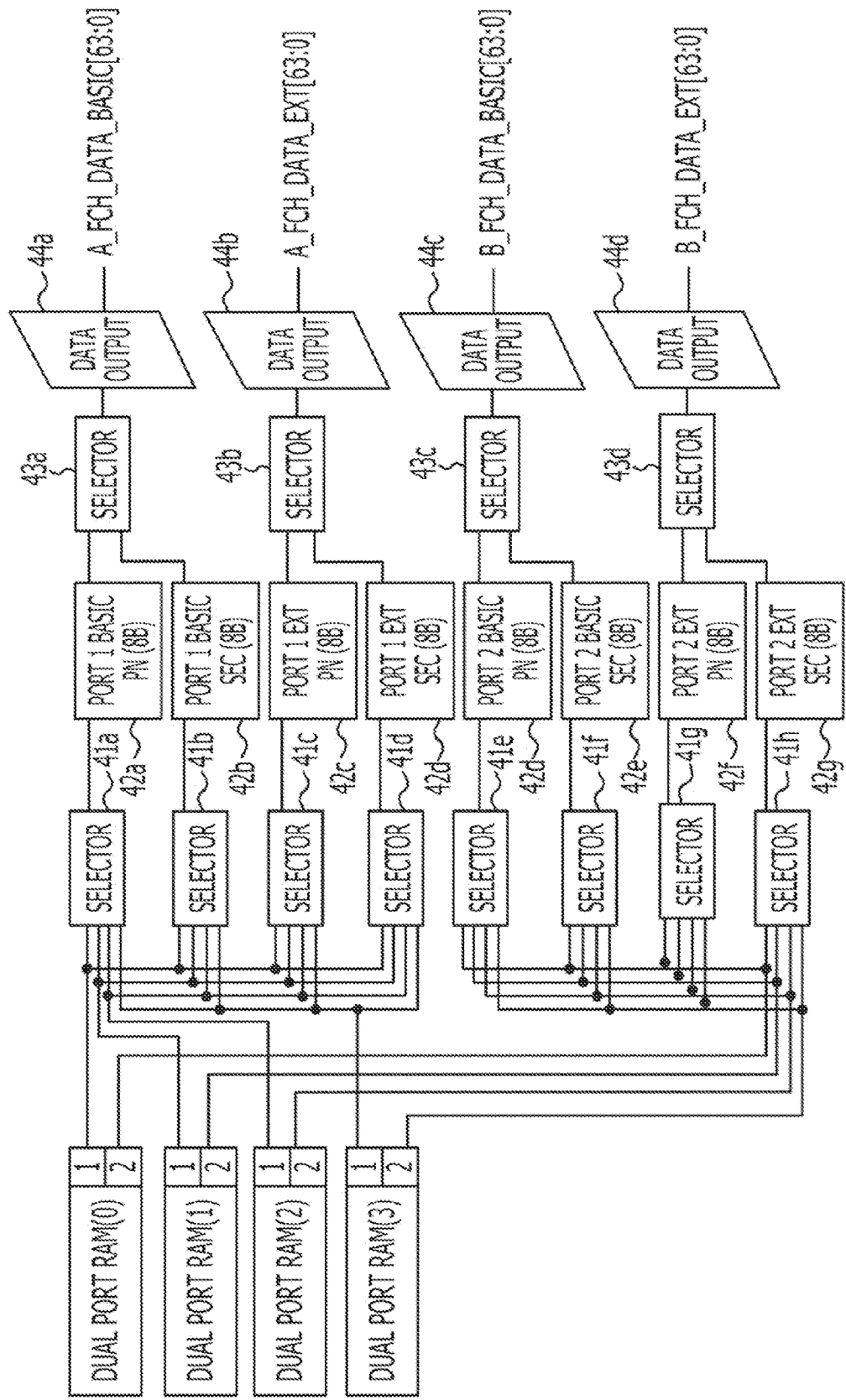
FIG. 17 illustrates another configuration in which 16-byte data is supplied from a plurality of dual port RAM modules to an execution/instruction unit.

In addition, the configuration for taking data written to the primary data cache memory 4 and outputting to the execution/instruction unit 11 may also be like that illustrated in FIG. 17.

In a cache system including the configuration illustrated in FIG. 17, unit data stored in the memory units 22 of the dual port RAM is delimited in block units, with respective blocks distinguished by ways. In order to output 16-byte data to the execution/instruction unit 11 in accordance with SIMD instructions, the cache system illustrated in FIG. 17 is provided with selectors 41a to 41h and 43a to 43d.

Based on addresses supplied from the first address generator 30a, the second address generator 30b, the first address converter 31a and the second address converter 31b, the selectors 41a to 41h respectively select 8-byte data output from the first output port registers (labeled "1" in FIG. 17) of the dual port RAM modules RAM(0) to RAM(3). Subsequently, the selectors 43a to 43d input the 8-byte data selected by the selectors 41a to 41h, a number of sets of 8-byte data equal to the number of ways, and respectively select some of the 8-byte data in accordance with way selection instructions. Subsequently, the 8-byte data stored in the memory units 22 of the dual port RAM that was selected by selectors 43a to 43d is sequentially output to the execution/instruction unit 11 as 16-byte data.

As illustrated in FIG. 17, the first output port registers in the dual port RAM modules RAM(0) to RAM(3) are connected to the selectors 41a to 41d. The four sets of data output from the four first output port registers 23a are supplied to four selectors 41a to 41d used for data selection. The selectors 41a to 41d are respectively connected to 8-byte buffers 42a to 42d used for way selection. By following commands supplied from the execution/instruction unit 11, the selectors 41a to 41d respectively retrieve some of the data output from the first output port registers of the dual port RAM modules RAM(0) to RAM(3) connected thereto. Subsequently, the retrieved data is respectively output from the selectors 41a to 41d, and stored in buffers 42a to 42d connected to the selectors 41a to 41d.

Meanwhile, the selectors 41e to 41h are connected to the second output port registers (labeled "2" in FIG. 17) of the dual port RAM modules RAM(0) to RAM(3). The four sets of data output from the four second output port registers are supplied to four selectors 41e to 41h used for data selection. The selectors 41e to 41h are respectively connected to 8-byte buffers 42e to 42h used for way selection. By following commands supplied from the execution/instruction unit 11, the selectors 41e to 41h respectively retrieve some of the data output from the second output port registers of the dual port RAM modules RAM(0) to RAM(3) connected thereto. Subsequently, the retrieved data is respectively output from the selectors 41e to 41h, and stored in buffers 42e to 42h connected to the selectors 41e to 41h.

The buffers 42a to 42d are connected to selectors 43a and 43b, which are used to select the way from between way(0) and way(1). The selector 43a follows a way selection command supplied from the execution/instruction unit 11, and retrieves data from either the buffer 42a or 42b. The selector 43b follows a way selection command supplied from the execution/instruction unit 11, and retrieves data from either the buffer 42c or 42d. The data retrieved by the selectors 43a and 43b is supplied to the execution/instruction unit 11 as fetch data via data output units 44a and 44b.

The buffers 42e to 42h are connected to selectors 43c and 43d, which are used to select the way from between way(0) and way(1). The selector 43c follows a way selection command supplied from the execution/instruction unit 11, and retrieves data from either the buffer 42e or 42f. The selector 43d follows a way selection command supplied from the execution/instruction unit 11, and retrieves data from either the buffer 42g or 42h. The data retrieved by the selectors 43c and 43d is supplied to the execution/instruction unit 11 as fetch data via data output units 44c and 44d.

In this way, by reading out 8-byte data from different dual port RAM modules 20, the cache system is able to generate 16-byte data to be read out by following SIMD instructions, and then output that data to the execution/instruction unit 11. In addition, even if the 16-byte data is stored straddling different ways, this cache system is able to read out 8-byte data from the output ports of all dual port RAM modules, and select 8-byte data in accordance with specified addresses. In so doing, this cache system is able to output 16-byte data by a simple pattern layout compared to the case where data is selected on a per-way basis after determining the way of the data to be read out.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:
1. A cache system, comprising:
  a computation unit;
  primary cache memory configured to input and output data between the computation unit;

the primary cache memory includes
a storing unit including multi-port memory units that store unit data having a first data size,
a writing unit that simultaneously writes a plurality of unit data sequentially inputted via input port registers to consecutive locations of the storing unit, and
an outputting unit that reads out and outputs the plurality of unit data written in the storing unit by the writing unit to a plurality of output port registers;
wherein when writing data having a second data size that is an arbitrary multiple of a first data size and is segmented into unit data to the primary cache memory, the data is stored in different multi-port memory units by conducting a first write operation that writes the sequential unit data to the input port registers in a subset of the multi-port memory units, and
a second write operation that writes the sequential unit data to the input port registers in another subset of the multi-port memory units; and
when reading out data from the primary cache memory, the data is read out from different multi-port memory units by conducting
a first read operation that reads a sequential unit data from the output port registers of a subset of the multi-port memory units, and
a second read operation that reads a sequential unit data from the output port registers of the remaining subset of the multi-port memory units.

2. The cache system according to claim 1, further comprising:
secondary cache memory configured to input and output data between the primary cache memory.

3. The cache system according to claim 1, further comprising:
an address generating unit that generates addresses for reading out data of the second data size and generates a first address for reading out unit data stored in the multi-port memory units; and
an address converting unit that converts addresses generated by the address generating unit and converts the first address generated by the address generating unit into a second address for reading out unit data succeeding the unit data stored in the multi-port memory units.

4. The cache system according to claim 3, further comprising:
selectors that select any of unit data outputted from output ports in respective multi-port memory units based on addresses supplied from the address generating unit or the address converting unit;
wherein the unit data stored in the multi-port memory units that has been selected by the selectors is sequentially output to the computation unit in units of the second data size.

5. The cache system according to claim 3, further comprising:
first selectors that select particular unit data outputted from output ports in respective multi-port memory units based on addresses supplied from the address generating unit or the address converting unit; and
second selectors that select particular unit data being equal to the number of ways selected by any of the first selectors, in accordance with way selection instructions;
wherein the unit data stored in the multi-port memory units that has been selected by the second selectors is sequentially output to the computation unit in units of the second data size.

6. A cache system, comprising:
a primary cache memory configured to input and output data between a computation unit, the primary cache memory includes:
a storing unit including multi-port memory units that store unit data having a first data size,
a writing unit that simultaneously writes sequentially inputted plural unit data to consecutive locations of the storing unit, and
an outputting unit that reads out and outputs unit data written in the storing unit;
when writing data having a second data size that is an arbitrary multiple of a first data size and is segmented into unit data to the primary cache memory, the data is stored in different multi-port memory units by writing the sequential unit data to a subset of the multi-port memory units, and writing the other sequential unit data to another subset of the multi-port memory units.

* * * * *